United States Patent
Kubalska et al.

(10) Patent No.: US 6,895,458 B2
(45) Date of Patent: May 17, 2005

(54) OPCODE TO TURN AROUND A BI-DIRECTIONAL BUS

(75) Inventors: Ewa M. Kubalska, San Jose, CA (US); Lisa Grenier, San Jose, CA (US); Yan Yan Tang, Mountain View, CA (US); Elena M. Ing, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 428 days.

(21) Appl. No.: 10/090,491

(22) Filed: Mar. 4, 2002

(65) Prior Publication Data

US 2003/0167365 A1 Sep. 4, 2003

(51) Int. Cl.[7] ............................................. G06F 13/00
(52) U.S. Cl. ........................ 710/110; 710/113; 345/503
(58) Field of Search .............................. 710/100, 104, 710/110, 112–114, 116, 119, 121, 123, 309, 310; 345/501–504, 519–522

(56) References Cited

U.S. PATENT DOCUMENTS 4,972,432 A * 11/1990 Wilson et al. .............. 375/220
5,848,072 A * 12/1998 Prill et al. .................. 370/471
6,624,817 B1 * 9/2003 Langendorf ................. 345/520
6,643,787 B1 * 11/2003 Zerbe et al. ................ 713/400

* cited by examiner

Primary Examiner—Khanh Dang
(74) Attorney, Agent, or Firm—Meyertons Hood Kivlin Kowert & Goetzel, P.C.; Jeffrey C. Hood; Mark K. Brightwell

(57) ABSTRACT

A system for managing the control of a bi-directional data bus between a master unit and a slave unit. The master couples to the slave through a request opcode bus, a reply opcode bus and the data bus. If the master is in a bus driving state (with respect to the data bus) and receives a read request, the master relinquishes bus control and sends a read request through the request opcode bus. The slave unit assumes bus control and sends the requested data through the data bus. If the master is in a bus sensing state and receives a write request, the master sends a last read opcode to the slave via the request opcode bus, and waits for the slave to return a special token through the reply opcode bus. Upon receiving the special token the master unit assumes bus control and performs the write transaction.

7 Claims, 10 Drawing Sheets

OPCODE TO TURN AROUND A BI-DIRECTIONAL BUS

BACKGROUND OF THE INVENTION

1. Field of the Invention

This invention relates generally to the field of data communication protocols and, more particularly, to a system for sharing a bi-directional data bus between a master device and a slave device.

2. Description of the Related Art

A master chip and a slave chip may share a data bus. The master chip may write data to the slave chip and/or read data from the slave chip through the data bus. In some situations, the slave chip may be configured to receive a transfer request from the master chip and service the transfer request in a deterministic amount of time. Thus, when the master chip asserts a read request to the slave chip and has a pending write to perform next, the master chip may wait a deterministic amount of time, assume control of the data bus, and perform the write associated with the write request. After the deterministic amount of time, the slave unit will have supplied the requested data on the data bus, the requested data will have been captured by an input port of the master chip, and thus, it will be safe to assume control of the data bus.

In other situations, the slave chip may not be able to service a transfer request in a deterministic amount of time. In such situations, the master's scheme of assuming bus control after a fixed amount of time may be inappropriate. Thus, there exists a need for a system and method of arbitrating bus control between a master unit and a slave unit especially in situations where the slave's servicing time for reqeusted transactions is non-deterministic.

SUMMARY OF THE INVENTION

In one set of embodiments, a system for arbitrating the control of a bi-directoinal data bus between a master unit and a slave unit may be configured as follows. The system may include a request opcode bus, a reply opcode bus, and arbitration control logic. The arbitration control logic may reside inside the master unit. The arbitration control logic may couple to the slave unit through the request opcode bus, the reply opcode bus and the data bus. The arbitration control logic may be configured to send a last read opcode to the slave unit through the request opcode bus in response to (a) receiving a write request from a transfer request buffer and (b) being in an electrically sensing state with respect to the data bus. Furthermore, the arbitration control logic may be configured to (c) switch to an electrically driving state and (d) write data values corresponding to the write request in response to receiving a token from the slave unit through the reply opcode bus.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
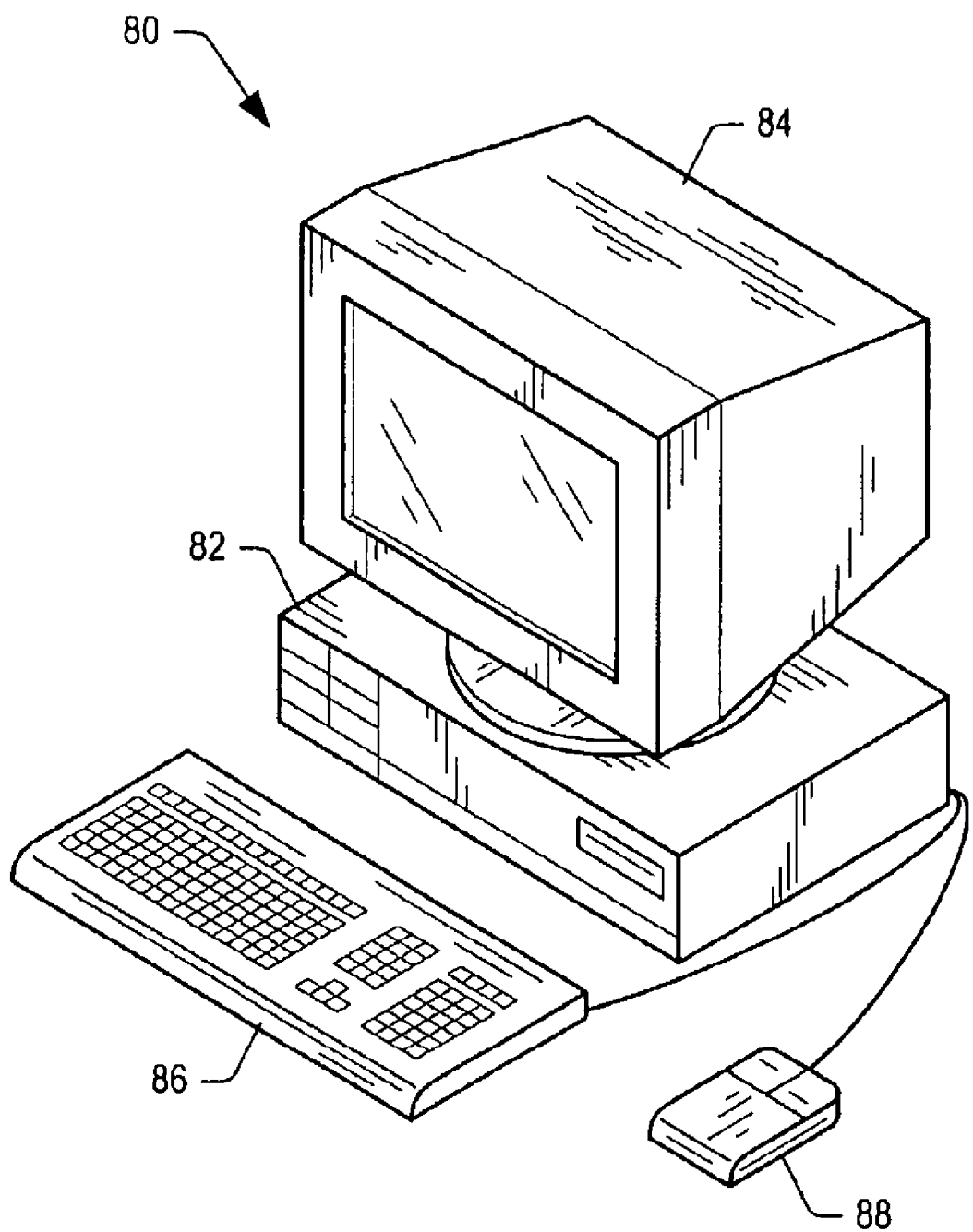
FIG. 1 is a perspective view of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

Computer System—FIG. 1

FIG. 1 illustrates one embodiment of a computer system 80 that includes a graphics system. The graphics system may be included in any of various systems such as computer systems, network PCs, Internet appliances, televisions (e.g. HDTV systems and interactive television systems), personal digital assistants (PDAs), virtual reality systems, and other devices which display 2D and/or 3D graphics, among others.

As shown, the computer system 80 includes a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, or body sensors). Application software may be executed by the computer system 80 to display graphical objects on display device 84.

Figure 2:
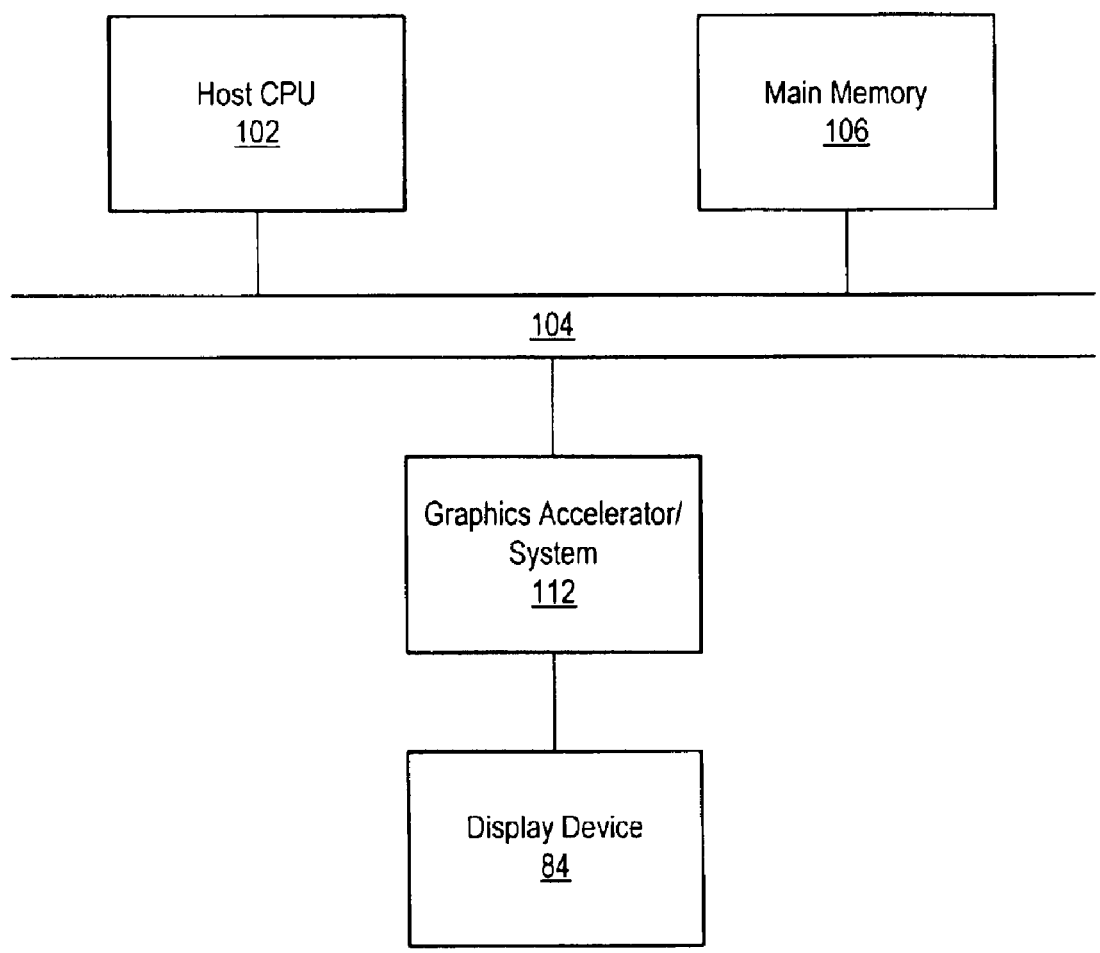
FIG. 2 is a simplified block diagram of one embodiment of a computer system.

Computer System Block Diagram—FIG. 2

FIG. 2 is a simplified block diagram illustrating the computer system of FIG. 1. As shown, the computer system 80 includes a central processing unit (CPU) 102 coupled to a high-speed memory bus or system bus 104 also referred to as the host bus 104. A system memory 106 (also referred to herein as main memory) may also be coupled to high-speed bus 104.

Host processor 102 may include one or more processors of varying types, e.g., microprocessors, multi-processors and CPUs. The system memory 106 may include any combination of different types of memory subsystems such as random access memories (e.g., static random access memories or "SRAMs," synchronous dynamic random access memories or "SDRAMs," and Rambus dynamic random access memories or "RDRAMs," among others), read-only memories, and mass storage devices. The system bus or host bus 104 may include one or more communication or host computer buses (for communication between host processors, CPUs, and memory subsystems) as well as specialized subsystem buses.

In FIG. 2, a graphics system 112 is coupled to the high-speed memory bus 104. The graphics system 112 may be coupled to the bus 104 by, for example, a crossbar switch or other bus connectivity logic. It is assumed that various other peripheral devices, or other buses, may be connected to the high-speed memory bus 104. It is noted that the graphics system 112 may be coupled to one or more of the buses in computer system 80 and/or may be coupled to various types of buses. In addition, the graphics system 112 may be coupled to a communication port and thereby directly receive graphics data from an external source, e.g., the Internet or a network. As shown in the figure, one or more display devices 84 may be connected to the graphics system 112.

Host CPU 102 may transfer information to and from the graphics system 112 according to a programmed input/output (I/O) protocol over host bus 104. Alternately, graphics system 112 may access system memory 106 according to a direct memory access (DMA) protocol or through intelligent bus mastering.

A graphics application program conforming to an application programming interface (API) such as OpenGL® or Java 3D™ may execute on host CPU 102 and generate commands and graphics data that define geometric primitives such as polygons for output on display device 84. Host processor 102 may transfer the graphics data to system memory 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including host CPU 102 and/or system memory 106, other memory, or from an external source such as a network (e.g. the Internet), or from a broadcast medium, e.g., television, or from other sources.

Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module. Additionally, in some embodiments, certain of the processing operations performed by elements of the illustrated graphics system 112 may be implemented in software.

Figure 3:
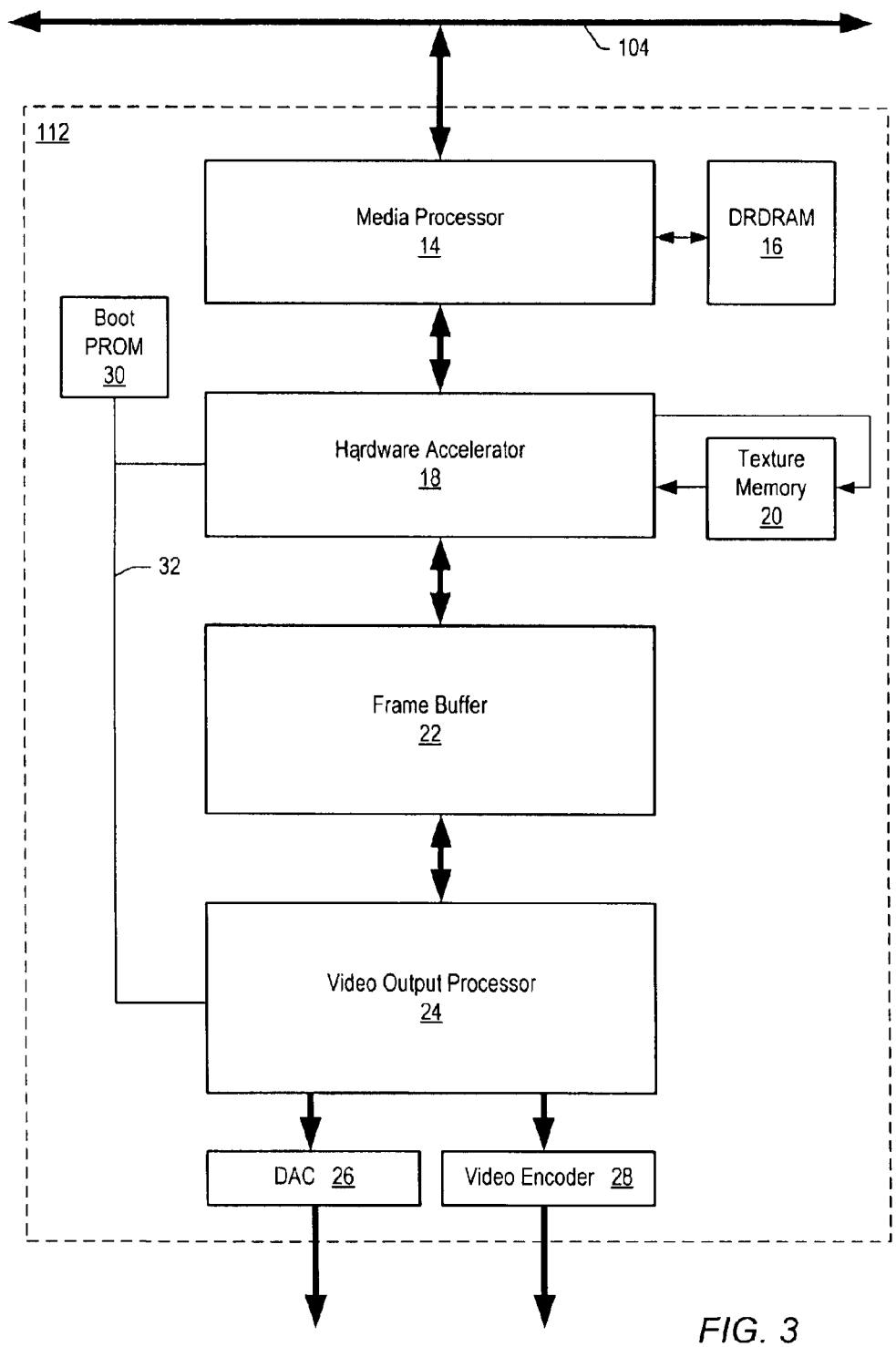
FIG. 3 is a functional block diagram of one embodiment of a graphics system.

Graphics System—FIG. 3

FIG. 3 is a functional block diagram illustrating one embodiment of graphics system 112. Note that many other embodiments of graphics system 112 are possible and contemplated. Graphics system 112 may include one or more media processors 14, one or more hardware accelerators 18, one or more texture buffers 20, one or more frame buffers 22, and one or more video output processors 24. Graphics system 112 may also include one or more output devices such as digital-to-analog converters (DACs) 26, video encoders 28, flat-panel-display drivers (not shown), and/or video projectors (not shown). Media processor 14 and/or hardware accelerator 18 may include any suitable type of high performance processor (e.g., specialized graphics processors or calculation units, multimedia processors, DSPs, or general purpose processors).

In some embodiments, one or more of these components may be removed. For example, the texture buffer may not be included in an embodiment that does not provide texture mapping. In other embodiments, all or part of the functionality incorporated in either or both of the media processor or the hardware accelerator may be implemented in software.

In one set of embodiments, media processor 14 is one integrated circuit and hardware accelerator is another integrated circuit. In other embodiments, media processor 14 and hardware accelerator 18 may be incorporated within the same integrated circuit. In some embodiments, portions of media processor 14 and/or hardware accelerator 18 may be included in separate integrated circuits.

As shown, graphics system 112 may include an interface to a host bus such as host bus 104 in FIG. 2 to enable graphics system 112 to communicate with a host system such as computer system 80. More particularly, host bus 104 may allow a host processor to send commands to the graphics system 112. In one embodiment, host bus 104 may be a bi-directional bus.

Figure 4:
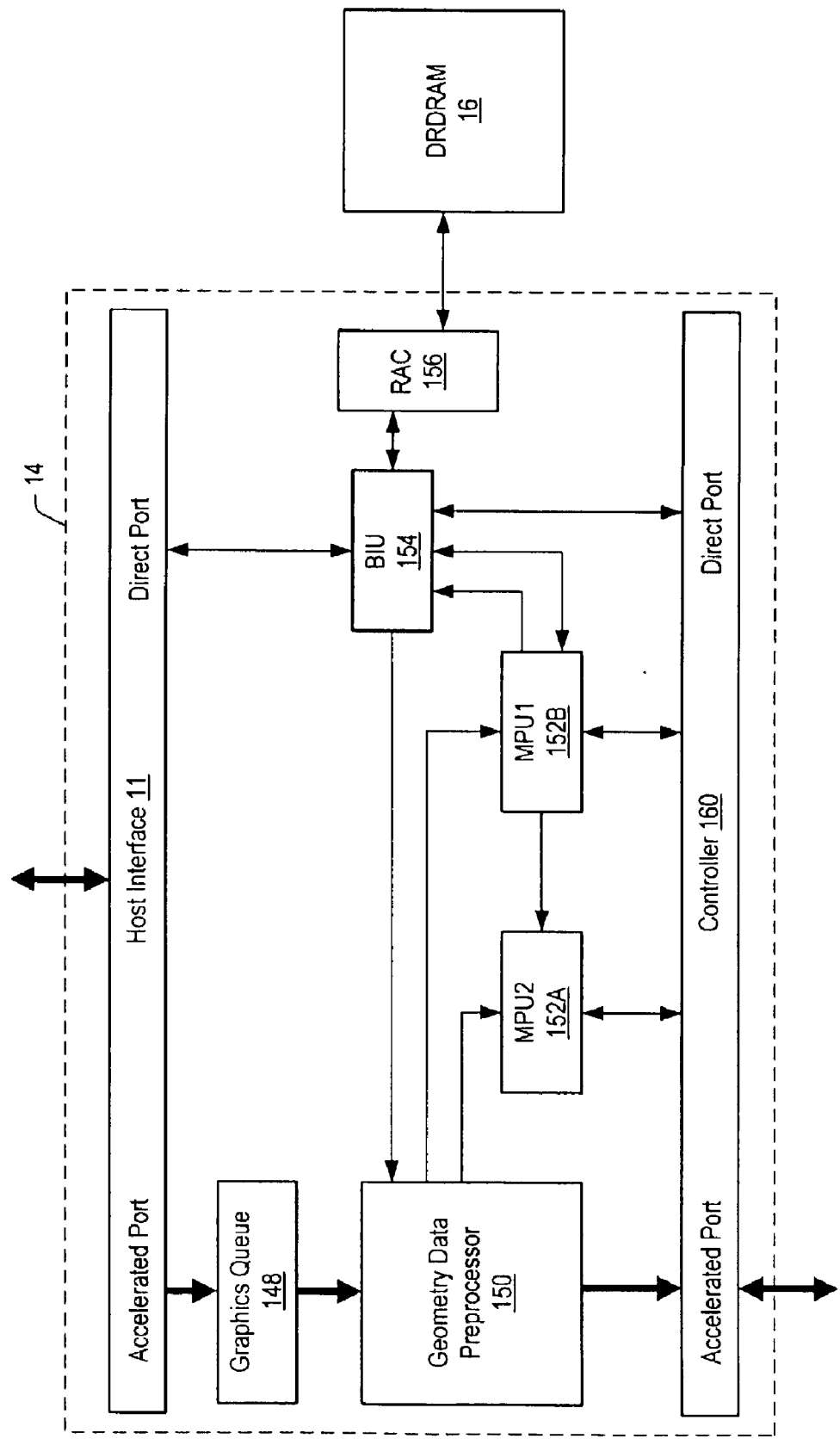
FIG. 4 is a functional block diagram of one embodiment of the media processor of FIG. 3.

Media Processor—FIG. 4

FIG. 4 shows one embodiment of media processor 14. As shown, media processor 14 may operate as the interface between graphics system 112 and computer system 80 by controlling the transfer of data between computer system 80 and graphics system 112. In some embodiments, media processor 14 may also be configured to perform transformations, lighting, and/or other general-purpose processing operations on graphics data.

Transformation refers to the spatial manipulation of objects (or portions of objects) and includes translation, scaling (e.g. stretching or shrinking), rotation, reflection, or combinations thereof. More generally, transformation may include linear mappings (e.g. matrix multiplications), non-linear mappings, and combinations thereof.

Lighting refers to calculating the illumination of the objects within the displayed image to determine what color values and/or brightness values each individual object will have. Depending upon the shading algorithm being used (e.g., constant, Gourand, or Phong), lighting may be evaluated at a number of different spatial locations.

As illustrated, media processor 14 may be configured to receive graphics data via host interface 11. A graphics queue 148 may be included in media processor 14 to buffer a stream of data received via the accelerated port of host interface 11. The received graphics data may include one or more graphics primitives. As used herein, the term graphics primitive may include polygons, parametric surfaces, splines, NURBS (non-uniform rational B-splines), subdivisions surfaces, fractals, volume primitives, voxels (i.e., three-dimensional pixels), and particle systems. In one embodiment, media processor 14 may also include a geometry data preprocessor 150 and one or more microprocessor units (MPUs) 152. MPUs 152 may be configured to perform vertex transformation, lighting calculations and other programmable functions, and to send the results to hardware accelerator 18. MPUs 152 may also have read/write access to texels (i.e. the smallest addressable unit of a texture map)

and pixels in the hardware accelerator 18. Geometry data preprocessor 150 may be configured to decompress geometry, to convert and format vertex data, to dispatch vertices and instructions to the MPUs 152, and to send vertex and attribute tags or register data to hardware accelerator 18.

As shown, media processor 14 may have other possible interfaces, including an interface to one or more memories. For example, as shown, media processor 14 may include direct Rambus interface 156 to a direct Rambus DRAM (DRDRAM) 16. A memory such as DRDRAM 16 may be used for program and/or data storage for MPUs 152. DRDRAM 16 may also be used to store display lists and/or vertex texture maps.

Media processor 14 may also include interfaces to other functional components of graphics system 112. For example, media processor 14 may have an interface to another specialized processor such as hardware accelerator 18. In the illustrated embodiment, controller 160 includes an accelerated port path that allows media processor 14 to control hardware accelerator 18. Media processor 14 may also include a direct interface such as bus interface unit (BIU) 154. Bus interface unit 154 provides a path to memory 16 and a path to hardware accelerator 18 and video output processor 24 via controller 160.

Figure 5:
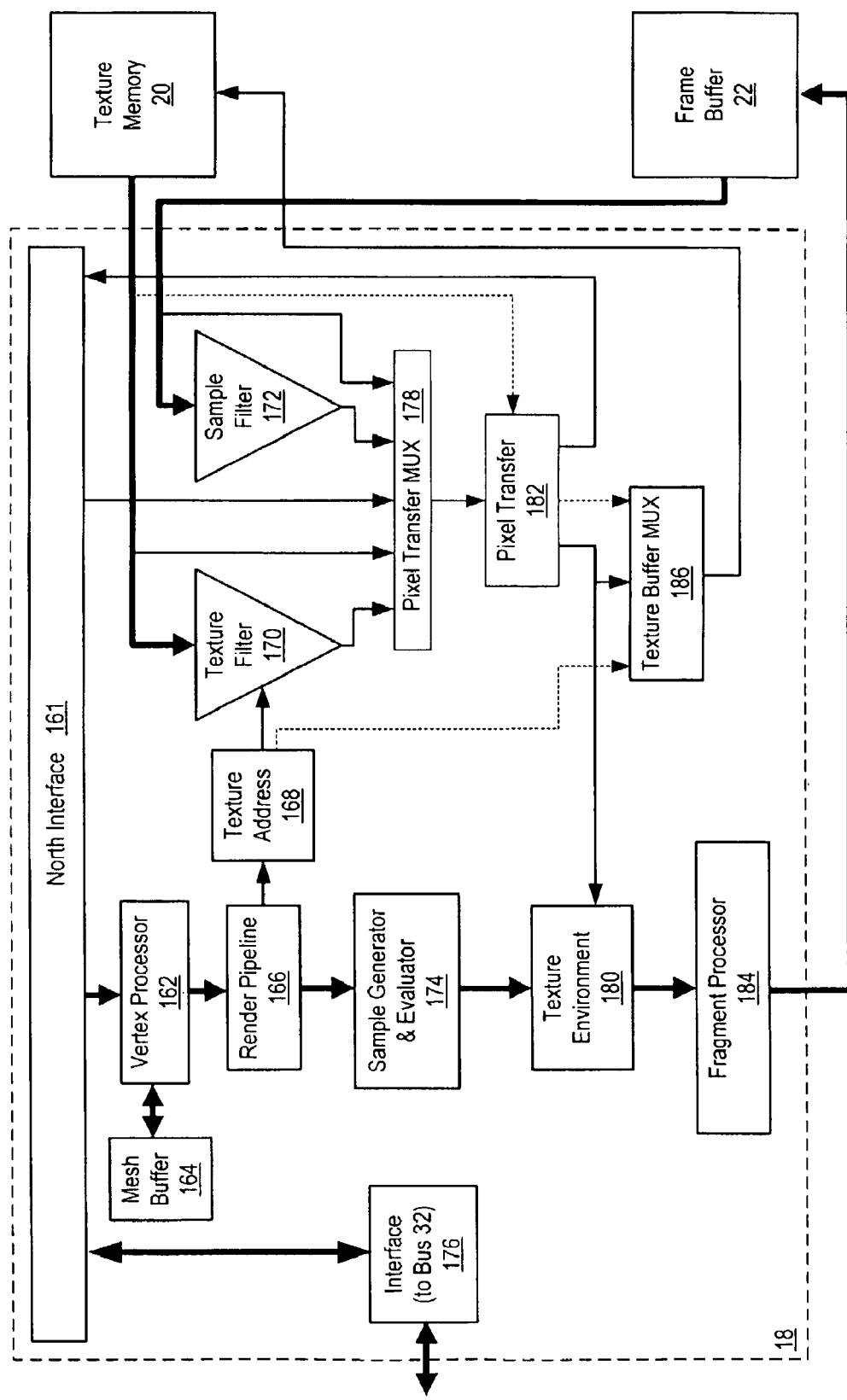
FIG. 5 is a functional block diagram of one embodiment of the hardware accelerator of FIG. 3.

Hardware Accelerator—FIG. 5

One or more hardware accelerators 18 may be configured to receive graphics instructions and data from media processor 14 and to perform a number of functions on the received data according to the received instructions. For example, hardware accelerator 18 may be configured to perform rasterization, 2D and/or 3D texturing, pixel transfers, imaging, fragment processing, clipping, depth cueing, transparency processing, set-up, and/or screen space rendering of various graphics primitives occurring within the graphics data.

Clipping refers to the elimination of graphics primitives or portions of graphics primitives that lie outside of a 3D view volume in world space. The 3D view volume may represent that portion of world space that is visible to a virtual observer (or virtual camera) situated in world space. For example, the view volume may be a solid truncated pyramid generated by a 2D view window, a viewpoint located in world space, a front clipping plane and a back clipping plane. The viewpoint may represent the world space location of the virtual observer. In most cases, primitives or portions of primitives that lie outside the 3D view volume are not currently visible and may be eliminated from further processing. Primitives or portions of primitives that lie inside the 3D view volume are candidates for projection onto the 2D view window.

Set-up refers to mapping primitives to a three-dimensional viewport. This involves translating and transforming the objects from their original "world-coordinate" system to the established viewport's coordinates. This creates the correct perspective for three-dimensional objects displayed on the screen.

Screen-space rendering refers to the calculations performed to generate the data used to form each pixel that will be displayed. For example, hardware accelerator 18 may calculate "samples." Samples are points that have color information but no real area. Samples allow hardware accelerator 18 to "super-sample," or calculate more than one sample per pixel. Super-sampling may result in a higher quality image.

Hardware accelerator 18 may also include several interfaces. For example, in the illustrated embodiment, hardware accelerator 18 has four interfaces. Hardware accelerator 18 has an interface 161 (referred to as the "North Interface") to communicate with media processor 14. Hardware accelerator 18 may receive commands and/or data from media processor 14 through interface 161. Additionally, hardware accelerator 18 may include an interface 176 to bus 32. Bus 32 may connect hardware accelerator 18 to boot PROM 30 and/or video output processor 24. Boot PROM 30 may be configured to store system initialization data and/or control code for frame buffer 22. Hardware accelerator 18 may also include an interface to a texture buffer 20. For example, hardware accelerator 18 may interface to texture buffer 20 using an eight-way interleaved texel bus that allows hardware accelerator 18 to read from and write to texture buffer 20. Hardware accelerator 18 may also interface to a frame buffer 22. For example, hardware accelerator 18 may be configured to read from and/or write to frame buffer 22 using a four-way interleaved pixel bus.

The vertex processor 162 may be configured to use the vertex tags received from the media processor 14 to perform ordered assembly of the vertex data from the MPUs 152. Vertices may be saved in and/or retrieved from a mesh buffer 164.

The render pipeline 166 may be configured to rasterize 2D window system primitives and 3D primitives into fragments. A fragment may contain one or more samples. Each sample may contain a vector of color data and perhaps other data such as alpha and control tags. 2D primitives include objects such as dots, fonts, Bresenham lines and 2D polygons. 3D primitives include objects such as smooth and large dots, smooth and wide DDA (Digital Differential Analyzer) lines and 3D polygons (e.g. 3D triangles).

For example, the render pipeline 166 may be configured to receive vertices defining a triangle, to identify fragments that intersect the triangle.

The render pipeline 166 may be configured to handle full-screen size primitives, to calculate plane and edge slopes, and to interpolate data (such as color) down to tile resolution (or fragment resolution) using interpolants or components such as:

r, g, b (i.e., red, green, and blue vertex color);

r2, g2, b2 (i.e., red, green, and blue specular color from lit textures);

alpha (i.e. transparency);

z (i.e. depth); and s, t, r, and w (i.e. texture components).

In embodiments using super-sampling, the sample generator 174 may be configured to generate samples from the fragments output by the render pipeline 166 and to determine which samples are inside the rasterization edge. Sample positions may be defined by user-loadable tables to enable stochastic sample-positioning patterns.

Hardware accelerator 18 may be configured to write textured fragments from 3D primitives to frame buffer 22. The render pipeline 166 may send pixel tiles defining r, s, t and w to the texture address unit 168. The texture address unit 168 may use the r, s, t and w texture coordinates to compute texel addresses (e.g. addresses for a set of neighboring texels) and to determine interpolation coefficients for the texture filter 170. The texel addresses are used to access texture data (i.e. texels) from texture buffer 20. The texture buffer 20 may be interleaved to obtain as many neighboring texels as possible in each clock. The texture filter 170 may perform bilinear, trilinear or quadlinear interpolation. The pixel transfer unit 182 may also scale and bias and/or lookup texels. The texture environment 180 may apply texels to samples produced by the sample generator 174. The texture environment 180 may also be used to perform geometric transformations on images (e.g., bilinear scale, rotate, flip) as well as to perform other image filtering operations on texture buffer image data (e.g., bicubic scale and convolutions).

In the illustrated embodiment, the pixel transfer MUX 178 controls the input to the pixel transfer unit 182. The pixel transfer unit 182 may selectively unpack pixel data received via north interface 161, select channels from either the frame buffer 22 or the texture buffer 20, or select data received from the texture filter 170 or sample filter 172.

The pixel transfer unit 182 may be used to perform scale, bias, and/or color matrix operations, color lookup operations, histogram operations, accumulation operations, normalization operations, and/or min/max functions. Depending on the source of (and operations performed on) the processed data, the pixel transfer unit 182 may output the processed data to the texture buffer 20 (via the texture buffer MUX 186), the frame buffer 22 (via the texture environment unit 180 and the fragment processor 184), or to the host (via north interface 161). For example, in one embodiment, when the pixel transfer unit 182 receives pixel data from the host via the pixel transfer MUX 178, the pixel transfer unit 182 may be used to perform a scale and bias or color matrix operation, followed by a color lookup or histogram operation, followed by a min/max function. The pixel transfer unit 182 may then output data to either the texture buffer 20 or the frame buffer 22.

Fragment processor 184 may be used to perform standard fragment processing operations such as the OpenGL® fragment processing operations. For example, the fragment processor 184 may be configured to perform the following operations: fog, area pattern, scissor, alpha/color test, ownership test (WID), stencil test, depth test, alpha blends or logic ops (ROP), plane masking, buffer selection, pick hit/occlusion detection, and/or auxiliary clipping in order to accelerate overlapping windows.

Texture Buffer 20

Texture buffer 20 may include several SDRAMs. Texture buffer 20 may be configured to store texture maps, image processing buffers, and accumulation buffers for hardware accelerator 18. Texture buffer 20 may have many different capacities (e.g., depending on the type of SDRAM included in texture buffer 20). In some embodiments, each pair of SDRAMs may be independently row and column addressable.

Frame Buffer 22

Graphics system 112 may also include a frame buffer 22. In one embodiment, frame buffer 22 may include multiple memory devices such as 3D-RAM memory devices manufactured by Mitsubishi Electric Corporation. Frame buffer 22 may be configured as a display pixel buffer, an offscreen pixel buffer, and/or a super-sample buffer. Furthermore, in one embodiment, certain portions of frame buffer 22 may be used as a display pixel buffer, while other portions may be used as an offscreen pixel buffer and sample buffer.

Figure 6:
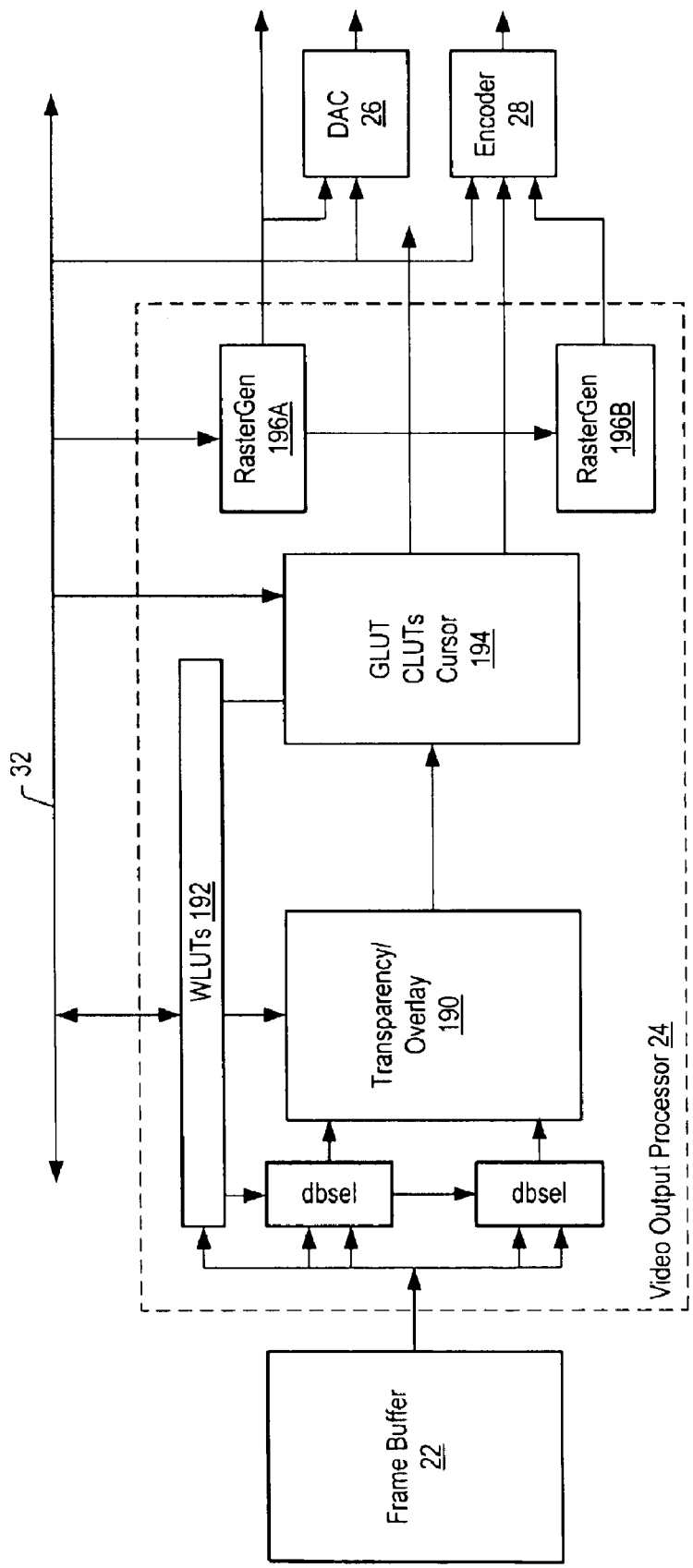
FIG. 6 is a functional block diagram of one embodiment of the video output processor of FIG. 3.

Video Output Processor—FIG. 6

A video output processor 24 may also be included within graphics system 112. Video output processor 24 may buffer and process pixels output from frame buffer 22. For example, video output processor 24 may be configured to read bursts of pixels from frame buffer 22. Video output processor 24 may also be configured to perform double buffer selection (dbsel) if the frame buffer 22 is double-buffered, overlay transparency (using transparency/overlay unit 190), plane group extraction, gamma correction, psuedocolor or color lookup or bypass, and/or cursor generation. For example, in the illustrated embodiment, the output processor 24 includes WID (Window ID) lookup tables (WLUTs) 192 and gamma and color map lookup tables (GLUTs, CLUTs) 194. In one embodiment, frame buffer 22 may include multiple 3DRAM64s 201 that include the transparency overlay 190 and all or some of the WLUTs 192. Video output processor 24 may also be configured to support two video output streams to two displays using the two independent video raster timing generators 196. For example, one raster (e.g., 196A) may drive a 1280×1024 CRT while the other (e.g., 196B) may drive a NTSC or PAL device with encoded television video.

DAC 26 may operate as the final output stage of graphics system 112. The DAC 26 translates the digital pixel data received from GLUT/CLUTs/Cursor unit 194 into analog video signals that are then sent to a display device. In one embodiment, DAC 26 may be bypassed or omitted completely in order to output digital pixel data in lieu of analog video signals. This may be useful when a display device is based on a digital technology (e.g., an LCD-type display or a digital micro-mirror display).

DAC 26 may be a red-green-blue digital-to-analog converter configured to provide an analog video output to a display device such as a cathode ray tube (CRT) monitor. In one embodiment, DAC 26 may be configured to provide a high resolution RGB analog video output at dot rates of 240 MHz. Similarly, encoder 28 may be configured to supply an encoded video signal to a display. For example, encoder 28 may provide encoded NTSC or PAL video to an S-Video or composite video television monitor or recording device.

In other embodiments, the video output processor 24 may output pixel data to other combinations of displays. For example, by outputting pixel data to two DACs 26 (instead of one DAC 26 and one encoder 28), video output processor 24 may drive two CRTs. Alternately, by using two encoders 28, video output processor 24 may supply appropriate video input to two television monitors. Generally, many different combinations of display devices may be supported by supplying the proper output device and/or converter for that display device.

Sample-to-Pixel Processing Flow

In one set of embodiments, hardware accelerator 18 may receive geometric parameters defining primitives such as triangles from media processor 14, and render the primitives in terms of samples. The samples may be stored in a sample storage area (also referred to as the sample buffer) of frame buffer 22. The samples are then read from the sample storage area of frame buffer 22 and filtered by sample filter 22 to generate pixels. The pixels are stored in a pixel storage area of frame buffer 22. The pixel storage area may be double-buffered. Video output processor 24 reads the pixels from the pixel storage area of frame buffer 22 and generates a video stream from the pixels. The video stream may be provided to one or more display devices (e.g. monitors, projectors, head-mounted displays, and so forth) through DAC 26 and/or video encoder 28.

Figure 7:
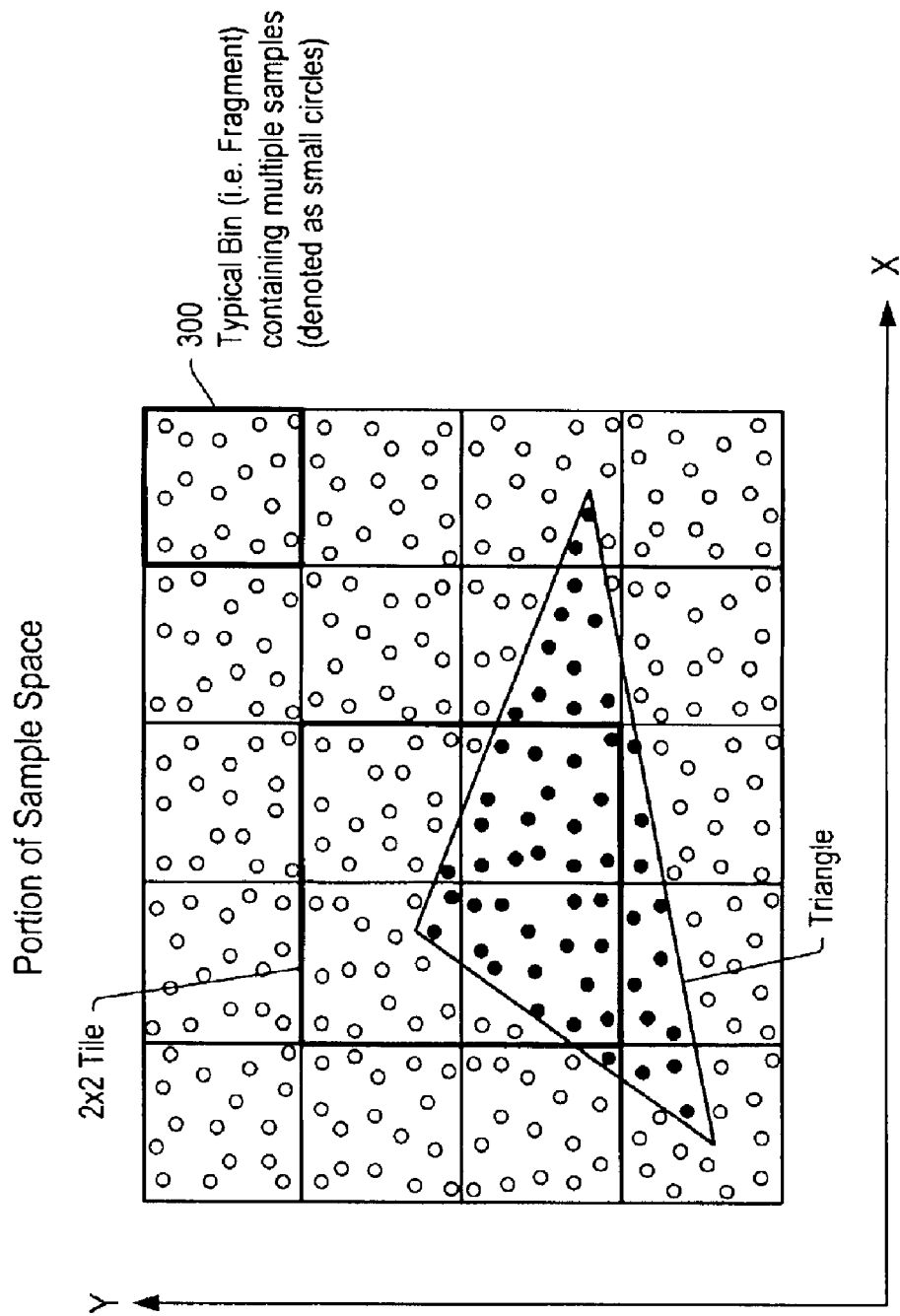
FIG. 7 illustrates sample space partitioned by an array of bins, and a superimposed triangle.

The samples are computed at positions in a two-dimensional sample space (also referred to as rendering space). The sample space may be partitioned into an array of bins (also referred to herein as fragments). The storage of samples in the sample storage area of frame buffer 22 may be organized according to bins as illustrated in FIG. 7. Each bin may contain one or more samples. The number of samples per bin may be a programmable parameter.

Bi-Directional Bus Control Using Special Opcode

Figure 8:
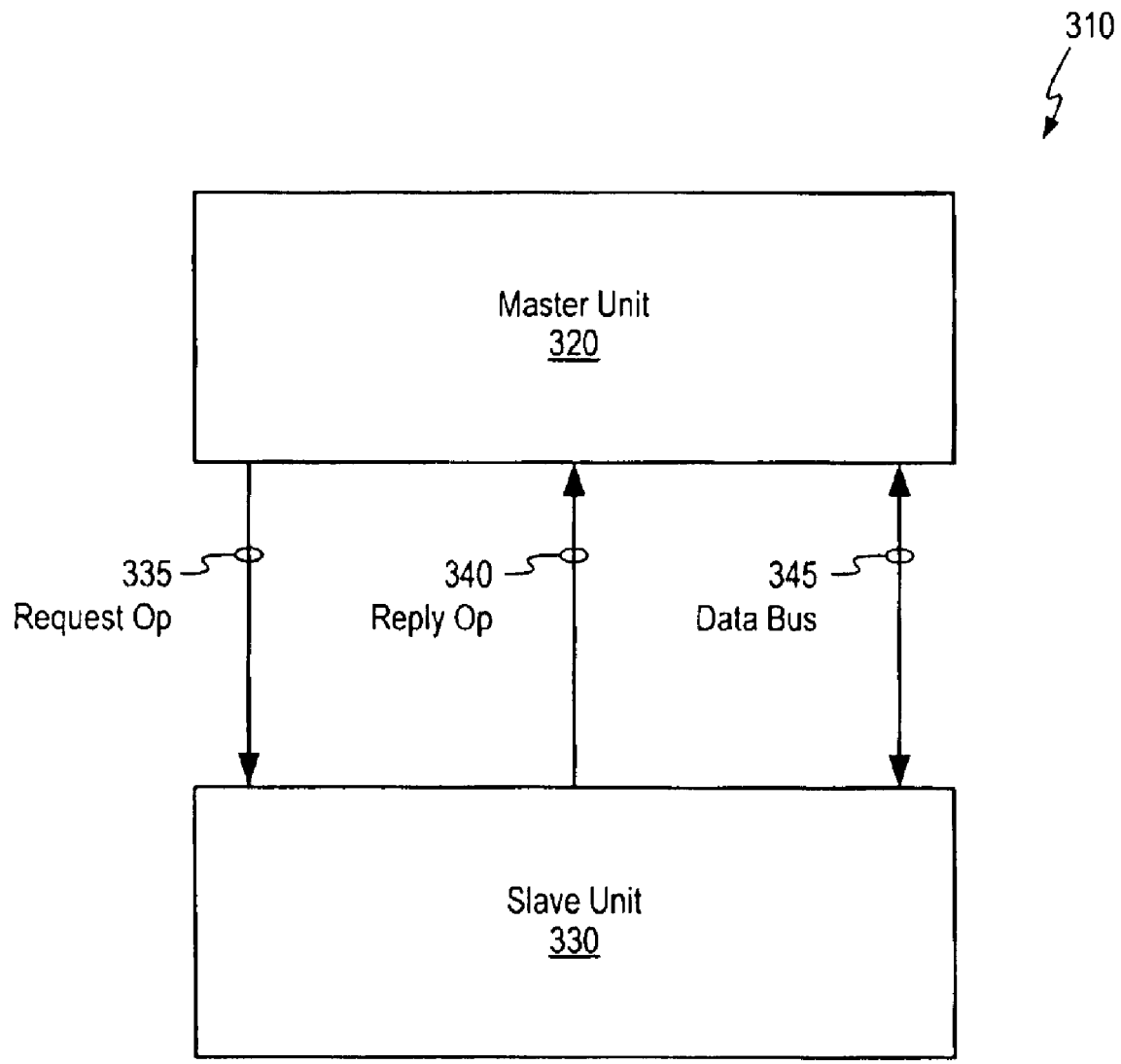
FIG. 8 illustrates one embodiment of a communication system including a master unit and a slave unit coupled by a request opcode bus, a reply opcode bus and a bi-directional data bus.

FIG. 8 illustrates a communication system 310. Communication system 310 includes a master unit 320 and a slave unit 330. The master unit couples to the slave unit through a request opcode bus 335, a reply opcode bus 340 and a bi-directional data bus 345.

Master unit 320 sends request opcodes (i.e. requests for transactions such as a read transfer or a write transfer) to slave unit 330 through the request opcode bus 335. Slave unit 330 sends reply opcodes to master unit 320 through the reply opcode bus 340. For convenience of discussion, the terms "write" and "read" are interpreted from the point of view of master unit 320. Thus, write transfers flow from master to slave, and read transfers flow from slave to master.

When master unit 320 needs to write data to slave unit 330, it may gain control of data bus 345 (if it does not already have control) and send the write data to slave unit 330 through data bus 345. When the master unit 320 needs to read data from slave unit 330, it may hand off control of data bus 345 to slave unit 330 so that slave unit 330 may send the requested read data to master unit 320 through data bus 345.

To avoid bus contention, the following mechanism for arbitration of bus control may be implemented. At startup (or reset), master unit 320 may control the data bus 345 (i.e. may electrically drive the data bus 345).

If master unit 320 needs to read from the slave, and master unit 320 currently controls the data bus 345, master unit 320 may relinquish control of the data bus 345 (i.e. transition from a state of electrically driving data bus 345 to a state of electrically sensing data bus 345), and send a read request to slave unit 330 through request opcode bus 335. When the slave unit 330 receives the read request, slave unit 330 may take control of the data bus 345, i.e. may transition from a state of electrically sensing data bus 345 to a state of electrically driving data bus 345.

Slave unit 330 attempts to service the read request. In one embodiment, slave unit 330 may access a memory device or an array of memory devices for the requested data, and send the requested data to master unit 320 through data bus 345. In another embodiment, slave unit 330 may itself include the memory device or the array of memory devices. In yet another embodiment, slave unit 330 may include computational resources, and the read request may be interpreted as a request for a computation, and the requested data returned by the slave to master may be the result of the computation.

In certain situations, master unit 320 may need to perform a whole series of reads. After having sent a first read request (as described above), master unit 320 will be in the sensing state and slave unit 330 will be in the driving state. Master unit 320 may then send a stream of additional read requests to slave unit 330 through request opcode bus 335, and slave unit 330 may send back a corresponding stream of request data values through data bus 345. Slave unit 330 maintains control of the data bus 345 during this read process.

When master unit 320 needs to write to slave unit 330, and is currently in the sensing state (i.e. in the state of electrically sensing data bus 345), master unit 320 may send a last read opcode to slave unit 330 through request opcode bus 335. In response to receiving the last read opcode, slave unit 330 completes any pending read requests it has received from master unit 320 (up to that point in time). In response to completing the pending read requests, slave unit 330 may transition from the state of electrically driving the data bus 345 to the state of electrically sensing the data bus 345, and send a "last read complete" token to master unit 320 through reply opcode bus 340.

In response to receiving the last read complete token, master unit 320 may transition from the state of electrically sensing the data bus 345 to the state of electrically driving the data bus 345, and transfer the write data to slave unit 330 through data bus 345.

When master unit 320 needs to write to slave unit 330, and is currently in the driving state (i.e. in the state of electrically driving the data bus 345), master unit 320 may immediately send the write data to slave unit 345 through data bus 345. (When master already has control of data bus 345, it is not necessary to use the last read opcode mechanism for regaining control.) Thus, a series of writes from master to slave may proceed rapidly. Depending on the master's state prior to the first write, master unit may use the last read opcode mechanism to regain control of the data bus 345. However, once master unit 325 has gained control, it may maintain control, and thus, the whole series of writes across data bus 345 may proceed rapidly, i.e. delays for re-negotiation of the data bus. (As used herein, a unit is said to be "in control of the data bus" when it is in the state of electrically driving the data bus 345.)

Figure 9:
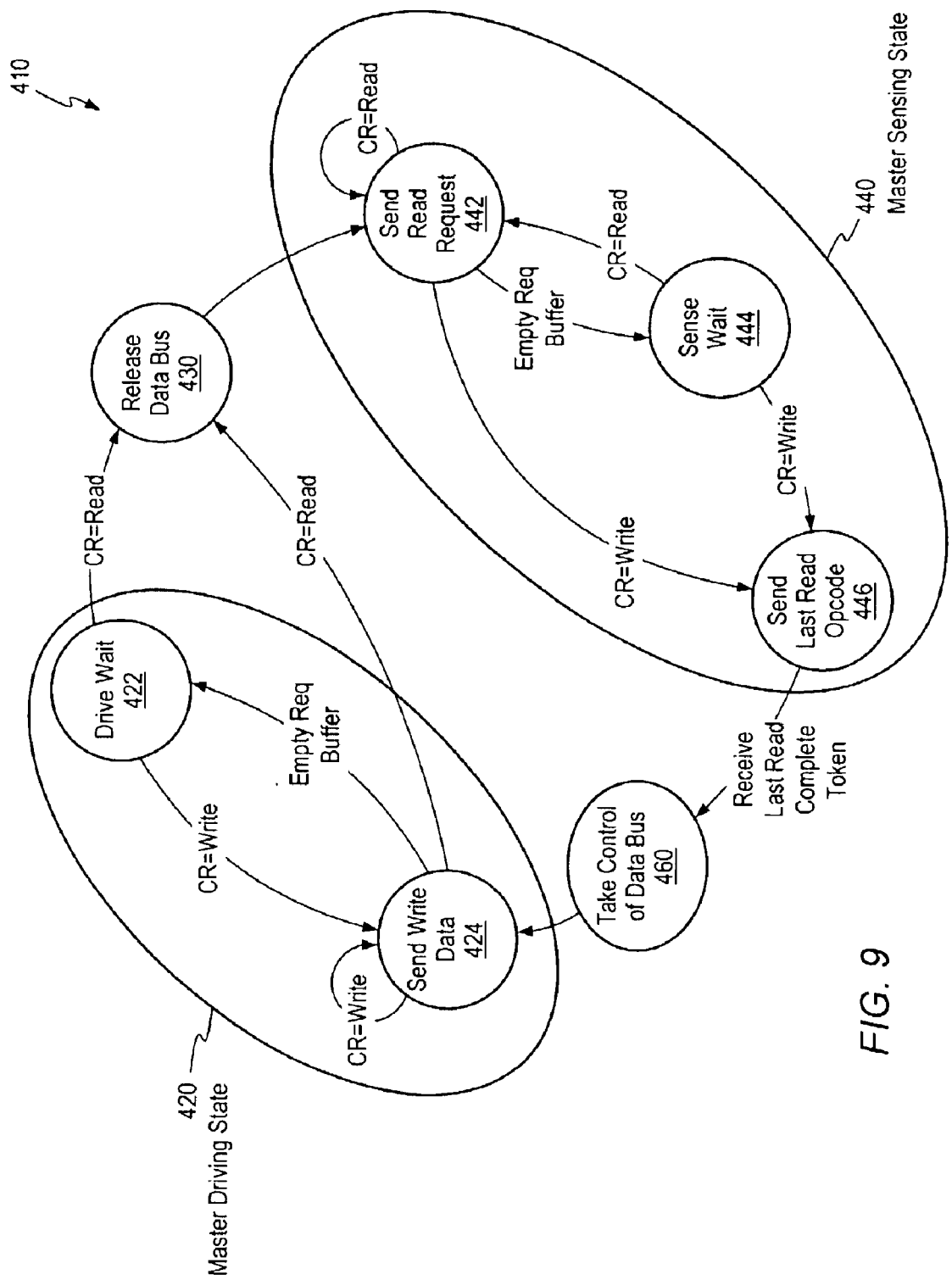
FIG. 9 illustrates a state machine implemented by one embodiment of the master unit.

FIG. 9 illustrates one emobidment of a state machine implemented by master unit 320. Master unit 420 wakes up (i.e. after reset or initialization) in master driving state 420 and drive wait substate 422. In master driving state 420, master unit 320 has control of the data bus 345, i.e. electrically drives the data bus 345.

Master unit 320 may include a transfer request buffer. The transfer request buffer may be organized as a first-in-first-out (FIFO) buffer. Circuits internal or external to master unit 320 may generate read requests (i.e. requests for the transfer of data from slave unit 330 to master unit 320 across the data bus 345) and/or write requests (i.e. requests for the transfer of data from master unit 320 to slave unit 330 across the data bus 345). Such circuits may send the read requests and write requests to the transfer request buffer. Arbitration control logic in the master unit 320 may pull requests off the transfer request buffer and implement the state machine of FIG. 9.

Figure 10:
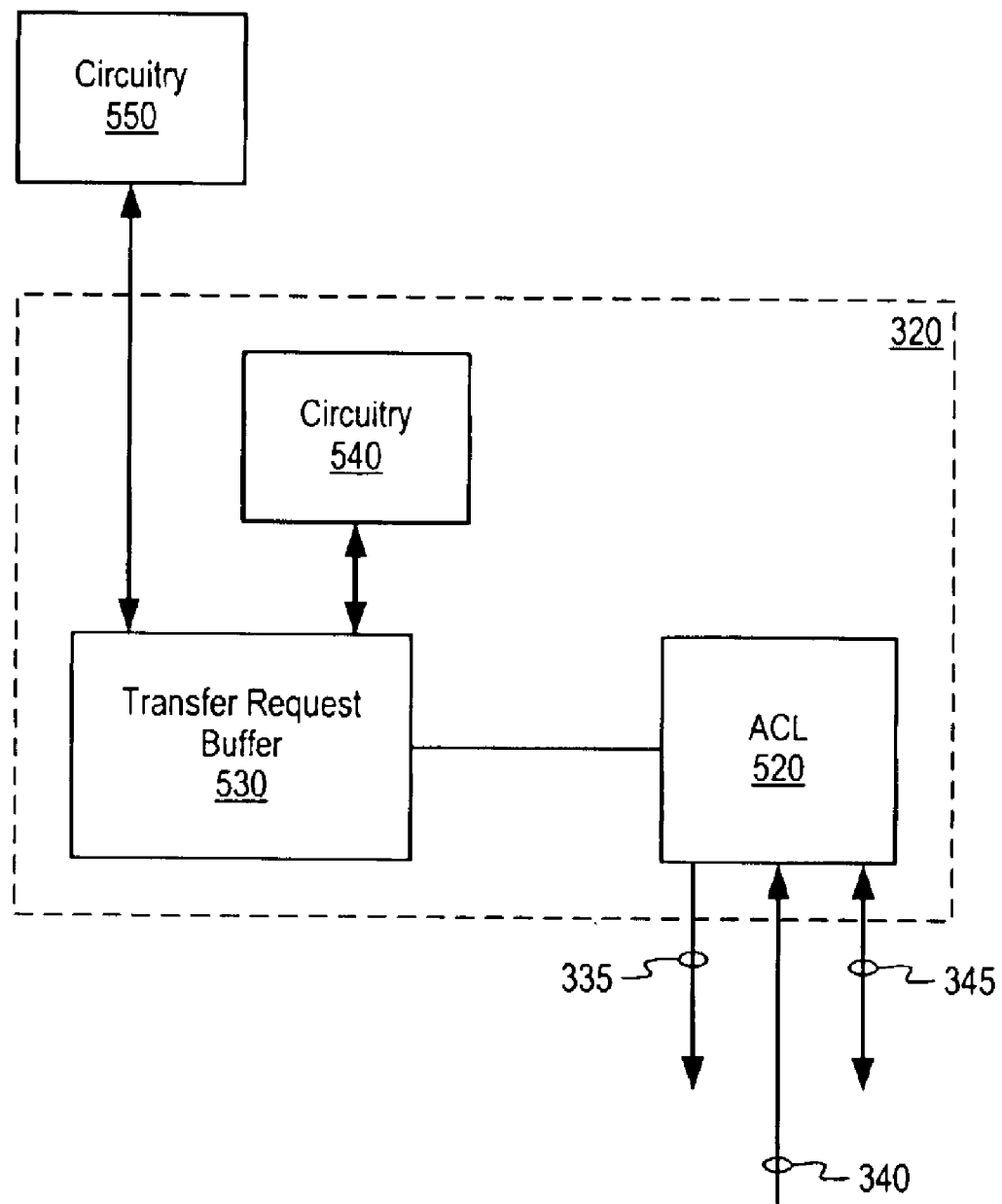
FIG. 10 illustrates one embodiment of the master unit.

FIG. 10 illustrates one embodiment of the master unit 320 including arbitration control logic 520, transfer reqeust buffer 530 and circuitry 540. Circuitry 540 is meant to summarize any circuitry internal to master unit 320 which may generate read and/or write requests, and send the read and/or write requests to transfer request buffer 530. Circuitry 550 is meant to summarize any circuitry external to master unit 320 which may generate read and/or write requests, and send the read and/or write requests to transfer request buffer 530. Arbitration control logic 540 may couple to the slave unit through the request opcode bus 335, reply opcode bus 340 and data bus 345.

The arbitration control logic 520 may remain in the drive wait substate 422 until the transfer request buffer becomes nonempty. When the transfer request buffer becomes nonempty, the arbitration control logic 520 may pull a request off the transfer request buffer. This request that the arbitration control logic 520 pulls off the transfer control buffer is referred to as the "current request". The arbitration control logic 520 transitions from drive wait substate 422 to substate 424 in response to the current request being a write request.

In substate 424, the arbitration control logic 520 sends the write data associated with the write request to the slave unit 330 through the data bus 345. After sending the write data, the arbitration control logic 520 may move to the drive wait substate 422 if the transfer request buffer is empty.

Alternatively, if, after sending the write data, the transfer request buffer is still nonempty, the arbitration control logic 520 may pull another request off the transfer request buffer. This newly pulled request is now the current request. If the current request is a write request, the arbitration control logic 520 may move from substate 424 to substate 424 (i.e. re-enter the same substate) to send more write data for the current (write) request. If the current request is a read request, the arbitration control logic 520 may move from substate 424 to state 430.

The arbitration control logic 520 also transitions from drive wait substate 422 to state 430 in response to the transfer request buffer becoming nonempty and the current request being a read request.

In state 430, the arbitration control logic 520 may release control of the data bus 435, i.e. circuit elements in the master unit 320 which interface with the data bus 435 switch from an electrically driving mode to a electrically sensing mode. Thus, after releasing control of the data bus 345, the arbitration control logic 520 is said to be in the master sensing state 440. After releasing control of the data bus 430, the arbitration control logic 520 moves into substate 442.

In substate 442, the arbitration control logic 520 sends the read request to the slave unit 330 through the request opcode bus 335. After sending the read request, the arbitration control logic 520 moves to sense wait substate 444 if the transfer request buffer is empty. However, if the transfer request buffer is nonempty, the arbitration control logic 520 pulls another request from the transfer request buffer. If the current request (i.e. just pulled request) is a read request, the arbitration control logic 520 re-enters the substate 442 to send the read request to slave. If the current request is a write request, the arbitration control logic 520 moves to the substate 446 (to be explained below).

In sense wait substate 444, the arbitration control logic 520 waits until the transfer request buffer becomes nonempty again. When the transfer request buffer becomes nonempty, the arbitration control logic 520 may pull another request off the transfer request buffer. Again this request is referred to as the "current request". The arbitration control logic 520 transitions from sense wait substate 444 back to substate 442 in response to the current request being a read request. Alternatively, the arbitration control logic 520 transitions from sense wait substate 444 to substate 446 in response to the current request being a write request.

In substate 446, the arbitration control logic 520 sends a last read opcode to the slave unit 330 through the request opcode bus 335. After sending the last read opcode, the master unit 320 waits to receive the last read complete token from the slave unit 330 through the reply opcode bus 340. In response to receiving the last read complete token from the slave, the arbitration control logic 520 moves to state 460.

In state 460, the arbitration control logic 520 takes control of the data bus 345, i.e. circuit elements in the master unit 320 which interface with the data bus 435 switch from an electrically sensing mode to an electrically driving mode. After taking control of the data bus 345, the arbitration control logic 520 moves into substate 424. Substate 424 has been described above.

In one set of embodiments, master unit 320 is a chip (i.e. integrated circuit) and the slave unit 330 is a separate chip. In one embodiment, the master unit 320 couples to a plurality of slave units like slave unit 330. The master may interact with each slave as described above, and may couple to each slave with a corresponding set of request operand bus, reply operand bus and bi-directional data bus.

In some embodiments, master unit 320 is a rendering chip suitable for use in graphics systems. For example, rendering circuits within master unit 420 may compute data values (e.g. pixel values or sample values) in response to receiving graphics data (e.g. primitives such as triangles). The slave unit 330 may couple to an array of memory devices (e.g. random access memory devices). To induce storage of the data values in the memory device array, the rendering circuits may generate write requests and push the write requests onto the tranfer request buffer. In addition the master unit 320 may include circuits (or may communicate with circuits) which operate on source data from the memory device array. To induce the reading of the source data from the memory device array, cuch circuits may generate read requests and push the read requests onto the transfer request buffer.

In one embodiment, hardware accelerator 18 may be implemented as a single chip including the arbitration control logic described above. However, hardware accelerator 18 may also include a programmable register which allows the arbitration control logic to be selectively turned on or off. For example, if the hardware accelerator chip is to directly interface with memory devices (instead of through a slave unit such as slave unit 330), it may be desirable to disable the arbitration control logic, and to enable other circuit which mediate a different bus control scheme. Thus, the hardware accelerator chip may be adaptable to the needs of various different users, system designers, etc.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

What is claimed is:

1. A system comprising:
   a master unit coupled to a slave unit through a request opcode bus, a reply opcode bus and a bi-directional data bus;
   wherein the master unit is configured to transfer a last read opcode to the slave unit through the request opcode bus to gain control of the data bus in response to receiving a write request when in a state of not having control of the data bus;
   wherein the master unit is configured to take control of the data bus in response to receiving a last read complete token from the slave unit through the reply opcode bus;
   wherein the master unit is configured to perform a write operation, corresponding to the write request, to the slave unit through the data bus after taking control of the data bus.

2. A system comprising:
   a master unit coupled to a slave unit through a request opcode bus, a reply opcode bus and a bi-directional data bus;
   wherein the slave unit is configured (a) to receive a last read opcode from the master unit through the request opcode bus, (b) to complete pending read requests, in response to receiving the last read opcode, by transferring data corresponding to the read requests to the master unit through the data bus, (c) releasing control of the data bus, and (d) transferring a last read complete token to the master unit.

3. The system of claim 1 or claim 2, wherein the master unit is a integrated circuit.

4. The system of claim 1 or claim 2, wherein the slave unit is an integrated circuit.

5. The system of claim 1 or claim 2, wherein the master unit is a graphics rendering chip.

6. The system of claim 1 or claim 2, wherein the slave unit couples to one or more memory devices and services transaction requests with respect to the memory devices for the master unit.

7. A system for arbitrating control of a data bus, the system comprising:

a request opcode bus;

a reply opcode bus; and arbitration control logic coupled to a slave unit through the request opcode bus, the reply opcode bus and the data bus, wherein the arbitration control logic is configured to send a first opcode to the slave unit through the request opcode bus in response to (a) receiving a write request from a transfer request buffer and (b) being in an electrically sensing state with respect to said data bus, wherein the arbitration logic is further configured to (c) switch to an electrically driving state with respect to said data bus and (d) write data values, corresponding to the write request, to the slave unit through the data bus in response to receiving a token from the slave unit through the reply opcode bus;

wherein the slave unit is configured to receive the last read opcode, to complete any pending read requests received up to the reception of the last read opcode, and to send a last read complete token to the arbitration control logic through the reply opcode bus.

* * * * *